United States Patent [19]

Bouwens

[11] 4,409,697
[45] Oct. 18, 1983

[54] BEEHIVE RACK

[76] Inventor: Dirk M. Bouwens, Ivy Green Farm, London Rd., Wymondham, Norfolk, England

[21] Appl. No.: 328,043

[22] Filed: Dec. 7, 1981

[51] Int. Cl.³ ............................................. A01K 47/00
[52] U.S. Cl. ............................................................ 6/6
[58] Field of Search ............................. 6/1, 6, 8, 4 B

[56] References Cited

U.S. PATENT DOCUMENTS

| | | | |
|---|---|---|---|
| 207,958 | 9/1878 | Erwin | 6/6 |
| 1,284,791 | 11/1918 | Schumaker | 6/6 |
| 3,108,294 | 10/1963 | Brown | 6/4 B |

FOREIGN PATENT DOCUMENTS 760915  9/1980  Greece ........................................ 6/6

*Primary Examiner*—Gene Mancene
*Assistant Examiner*—Kris R. Schulze
*Attorney, Agent, or Firm*—Lee, Smith & Jager

[57] ABSTRACT

A rack for a beehive for handling a brood chamber and a honey chamber. The rack includes a frame carrying the brood chamber below a queen excluder and the honey chamber above the queen excluder. The queen excluder is mounted on the frame to support the honey chamber, and the brood chamber is supported on a moveable portion of the frame which, in normal position, locates the top of the brood chamber against the queen excluder. The movable member is lowerable to release the brood chamber in order to permit its withdrawal from the frame for inspection purposes. In the preferred embodiment of the invention, the frame also includes a closure member to close the bee access aperture leading toward the brood chamber when the movable frame member is lowered.

8 Claims, 4 Drawing Figures

BEEHIVE RACK

FIELD OF THE INVENTION

This invention relates to a rack for a beehive, usually for a plurality of beehives which may number as many as a hundred or more.

BACKGROUND TO THE INVENTION

The most commonly used type of beehive is a single walled, top access, movable frame hive, such as the Dadant or Langstroph top access hive, and the invention is especially adapted to a hive of this type. The Dadant hive has: a brood chamber constituted by a brood box at the bottom, a queen excluder supported on top on the brood chamber to prevent passage of the queen while permitting passage of workers, and a honey chamber formed by one or more honey boxes or supers containing hanging frames. Access to the supers for withdrawal of honey frames is from the top, while access for bees is at the bottom of the brood chamber. Occasional access to the top for honey frame removal presents no great problem; a removable lid or cover enables the hanging frames readily to be removed. However, relatively frequent access to the brood chamber is necessary to inspect for signs of swarming (which must be prevented) and this is relatively laborious, requiring disassembly of the supers and queen excluder from above the brood box on which they are supported. In the case of a beekeeper having a large number of hives, inspection of the brood chambers can clearly be an arduous and time consuming task.

In addition, it is a common practice to move hives from one part of the country to another according to the seasons. This also can be an arduous task when a large number of hives are involved. All the hives must be closed at the bottom access to prevent escape of bees, and then the closed hives must be individually tied up, manhandled and stacked on to a lorry or trailer for transportation.

OBJECT OF THE INVENTION

It is a primary object of the invention to provide a solution to the above-described problems.

BRIEF SUMMARY OF THE INVENTION

According to one aspect of the invention, there is provided a rack for a beehive comprising a frame carrying a brood chamber below a queen excluder and a honey chamber above the queen excluder, wherein the queen excluder is mounted to the frame to support the honey chamber, and the brood chamber is supported on a movable member of the frame normally to locate the top of said brood chamber against the queen excluder, said member being lowerable to release the brood chamber in order to permit its withdrawal from the frame for inspection purposes.

According to another aspect of the invention, therefore, there is provided a rack for beehives comprising a frame supporting one or more tiers of hives each with a queen excluder mounted to the frame, a honey chamber supported on said queen excluder, and a brood chamber with bottom apertures for access by bees supported on the frame immediately beneath the queen excluder, and movable means carried by the frame to permit simultaneous closure of all the bee access apertures of the or each tier.

When the rack supports a plurality of tiers of hives, the bee access apertures of all the hives may be closable at once, but it will usually suffice if these apertures can be closed tier by tier.

BRIEF SUMMARY OF DRAWINGS AND DESCRIPTION OF EMBODIMENT

A practical arrangement of beehive rack in accordance with the invention will now be described by way of example with reference to the accompanying drawings, in which.

Figure 1:
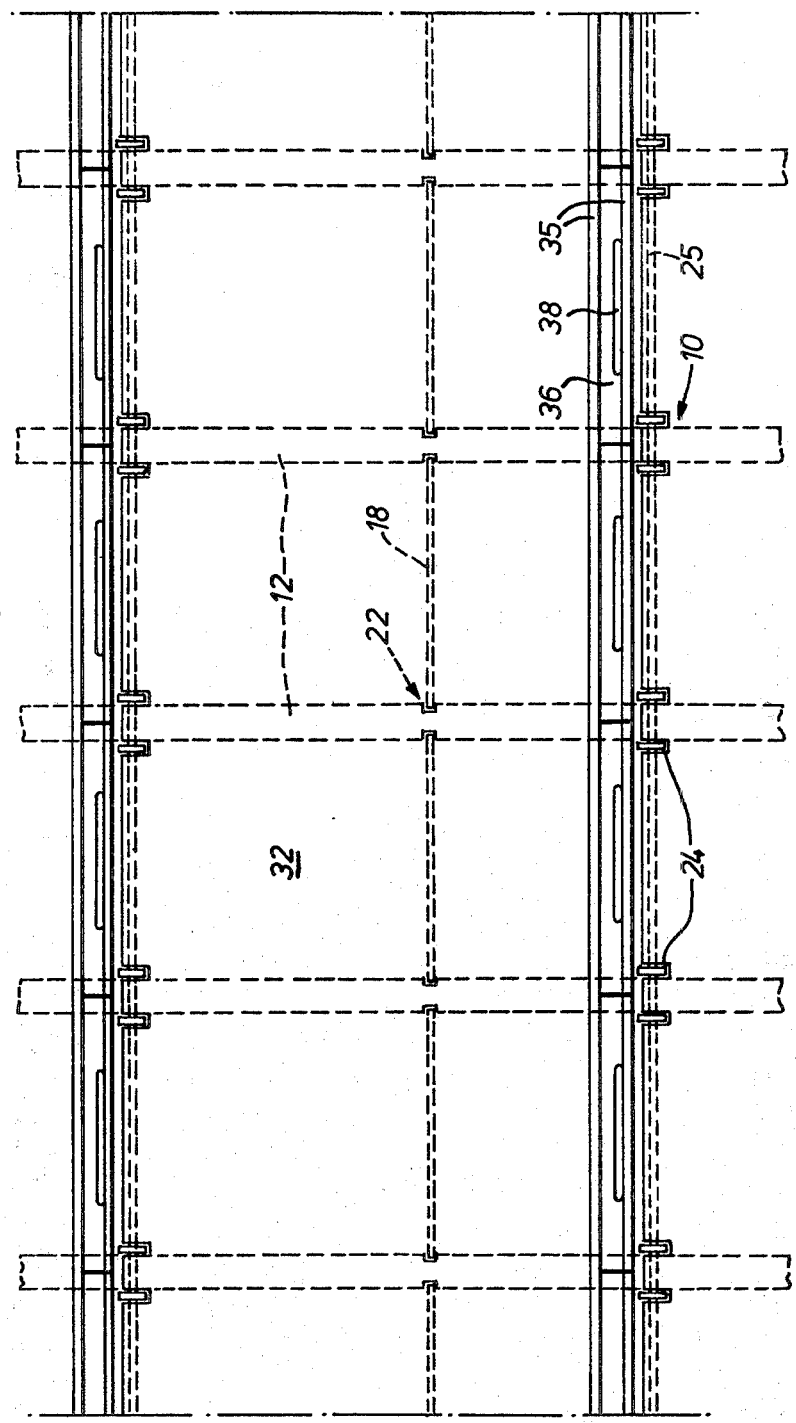
FIG. 1 is a front elevational view of part of a beehive rack having front and rear sections for front and back tiered rows of hives arranged back to back, each tier of each row to contain a plurality of hives side by side.
Figure 2:
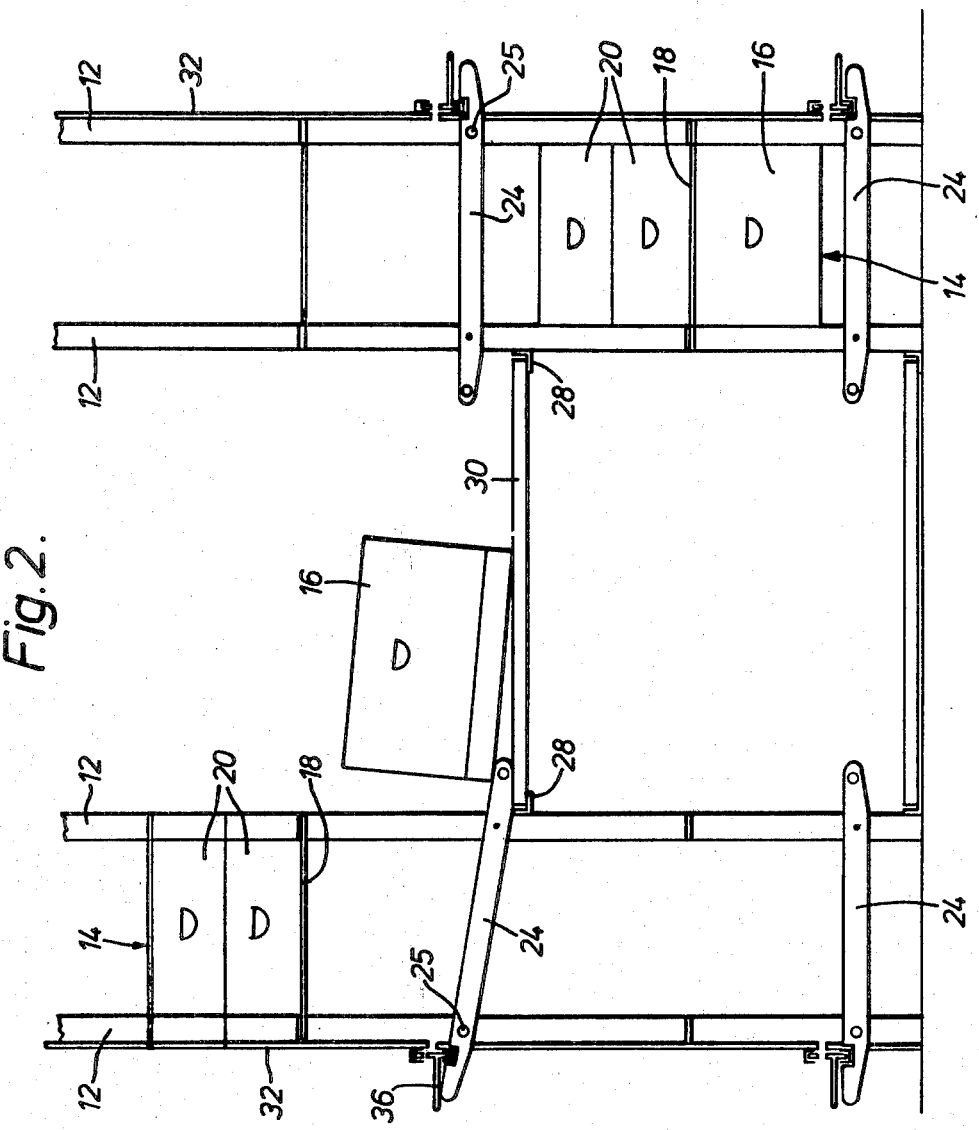
FIG. 2 is an end sectional view of the rack, also in part showing the hives.
Figure 3:
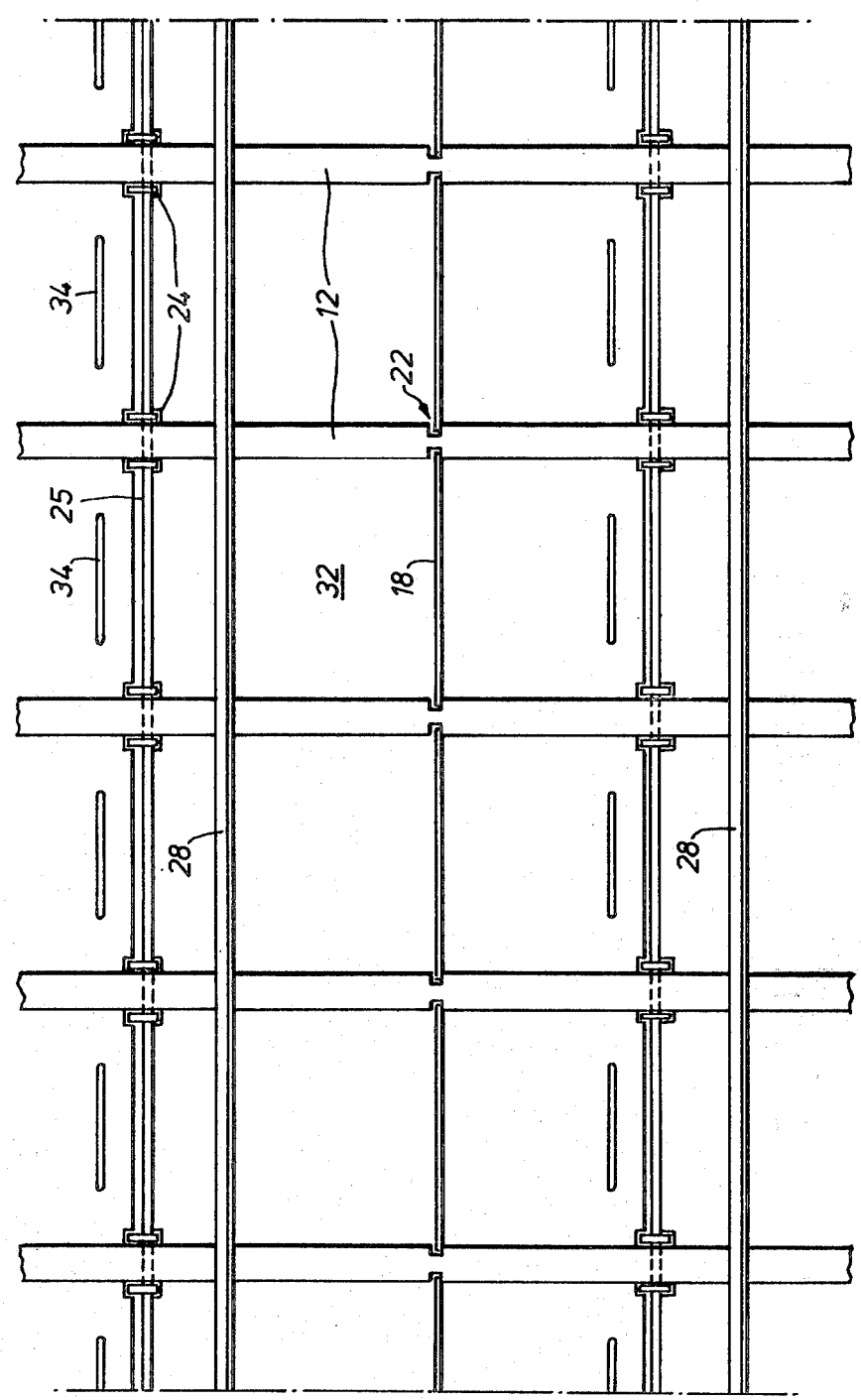
FIG. 3 is a rear elevational view of the front section of the rack.

The rack 10 comprises a frame having front and rear sections (see FIG. 2) each comprising a plurality of upright stanchions 12 arranged in two rows to define the front and back of a front tiered row of hives and of a rear tiered row of hives, respectively, adjacent stanchions in each row thereof being spaced in the longitudinal direction of the rack by the width of a hive. There may be as many as five or six stacked tiers of hives in each row, each tier containing fifty or sixty hives along the length of the row. The hives (see FIG. 2) are generally designated 14 and, as is conventional with a Dadant type hive, each comprise a brood box 16, queen excluder 18 and honey boxes or supers 20. However, contrary to a conventional hive in which the queen excluder is supported on the brood box, the queen excluders 18 are mounted to the frame, as indicated at 22, with a small freedom for play up and down. The honey boxes 20 are stacked on the frame-mounted excluders 18.

The brood boxes 16 are each supported, immediately beneath a queen excluder 18, on a pair of transverse (front to back) supporting members 24 pivotally mounted at 25 to adjacent stanchions 12 constituting the front row of stanchions for each tiered row of hives. Catches 26 (see FIG. 4) normally hold the supporting members 24 in a horizontal condition (dashed lines in FIG. 4), in which the top of the brood box 16 is located against the underside of the queen excluder 18.

The stanchions 12 at the facing backs of the front and rear sections of the frame are interconnected by longitudinally extending angle members 28, at a level just below the supporting members 24. These angle members 28 constitute supports for a platform 30 which can be moved along the rack 10, at a level appropriate to the height of a tier of hives 14 under consideration. From the platform 30, the catches 26 of a pair of supporting members appertaining to any one brood box 16 can be released, allowing the adjacent ends of the supporting members 24 to be lowered into parallel inclined orientations (FIGS. 2 and 4), for example to rest on the platform. The brood box 16 can then be slid from the rack 10 down the inclined supporting members 24 on to the platform 30, thereby to allow the brood chamber readily to be inspected. After inspection the brood box is easily returned to the rack by a reverse procedure. It is especially to be noted that by arranging the front and back tiered rows of hives back to back with an appropriate spacing therebetween to accommodate the platform 30, the brood chambers 16 of both front and rear tiers can be inspected, one level after the other, from a single passageway. Similarly, the single passageway enables ready access to the supers 20 for withdrawal of honey frames. Thus, the honey boxes 20 can readily be lifted from the frame-mounted queen excluders 18 on to the platform 30 to enable the lid or cover on the boxes to be removed and the honey frames withdrawn.

Figure 4:
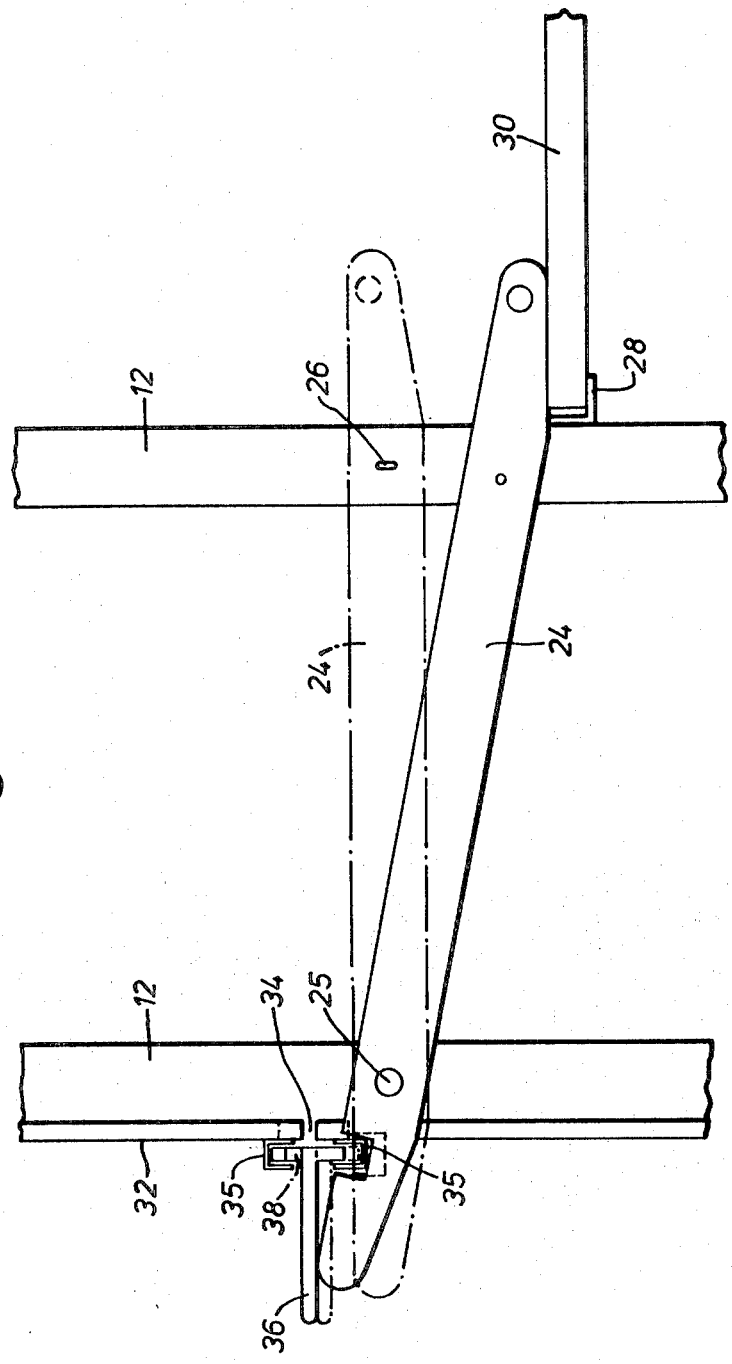
FIG. 4 shows details of the mechanism facilitating access to the brood chambers and closure of the bee access apertures.

The arrangement at the oppositely facing fronts of the front and rear sections of the frame, where the supporting members 24 are pivoted to the stanchions 12, appears most clearly from FIG. 4. The stanchions 12 defining the front of each tiered row of hives carry a facing 32 constituting a front (and rear) wall to the rack. This facing 32 is provided with longitudinal slots 34 which align with the access apertures for bees at the bottoms of the brood boxes 16. Opposed spaced channel members 35 are mounted one above the other on the stanchions 12 to extend longitudinally of the rack 10 and locate between them the crosspieces of T-sectioned bee-landing ledges 36, one for each hive 14, which ledges abut end to end. One limb of the crosspiece of each landing ledge 36 is slotted, as indicated at 38, and in the normal position of the ledges 36, these slots 38 are aligned with the access apertures for bees in the facing 32 and in the brood boxes 16. However, when the supporting members 24 are lowered in readiness for extraction of a brood box 16, the front ends of the supporting members 24 lift the corresponding ledge 36 so that it closes the access aperture 34 in the facing 32, thereby to prevent entry of bees while the chamber is removed.

Furthermore, if it is desired to close all the access apertures 34 in a tier, this is readily effected by pushing the abutting landing ledges 36 longitudinally from one end of the rack, typically through one half the width of a hive, so that the slots 38 in the ledges are no longer aligned in the horizontal direction with the slots 34 in the facing 32. This means of closure is advantageous when the hives are to be moved, e.g. from one site to another, transportation then being effected by lifting the entire rack 10, complete with closed hives 14, on to a lorry or trailer. The base of the rack is not shown in the drawings, but can comprise a platform or pallet to assist lifting.

The main structural parts of the rack may be made of metal, such as steel, or of wood or of rigid plastics material. Manufacture will preferably be in unit sizes, so that a rack can be increased in capacity by the joining on of one or more additional units.

It will be appreciated that the above described arrangement is by way of example only and may be modified in various ways within the scope of the invention. For example, the brood boxes may be supported for lowering and extraction on supporting members mounted for movement on the frame of the rack in other ways, with suitable coupling means being provided to close the bee access apertures automatically if desired. Equally, other means may be devised for operation, when appropriate, simultaneously to close all the bee access apertures of one or more tiers. Finally, it is to be understood that the means of providing ready access to the brood chamber is applicable to a small size rack, possibly carrying just one beehive, and in this case can be materially advantageous in reducing labour, especially for an elderly or infirm beekeeper.

I claim:

1. A beehive rack comprising a frame for carrying a brood chamber below a queen excluder and a honey chamber above the queen excluder, wherein means are provided fixedly to mount the queen excluder to the frame in order to support the honey chamber, the frame including a movable member which in a first position can support the brood chamber with the top of the latter located against the queen excluder, and means enabling lowering of said movable frame member to a second position in which the brood chamber is withdrawable from beneath the queen excluder for inspection purposes, including a facing to the frame which is formed with an aperture for alignment with a bee access aperture in the brood chamber, a closure member for said frame facing aperture, means movably supporting the closure member on the frame, and means whereby the closure member is moved to close said frame facing aperture when the movable frame member is lowered to its second position, said aperture remaining closed by said closure member independently of any withdrawing movement of the brood chamber.

2. A beehive rack according to claim 1, wherein said closure member carries a bee landing ledge.

3. A beehive rack according to claim 2, wherein said closure member has an aperture aligned with the frame facing aperture in the first position of the movable frame member and said closure member is displaced so that a non-apertured part thereof covers the frame facing aperture in the second position of the movable frame member.

4. A beehive rack according to claim 3, wherein the movable frame member is pivotted to the frame about a horizontal axis and the closure member is displaced vertically by said movable frame member when the latter is lowered.

5. A beehive rack according to claim 4, wherein said closure member is also manually displaceable in a horizontal direction parallel to said horizontal axis in order to close the frame facing aperture without lowering the movable frame member.

6. A beehive rack according to claim 5, for supporting a substantial plurality of hives in a plurality of horizontal tiers one above the other, wherein the movable frame members for the respective hives are individually lowerable, and the access closure members for a tier are adapted for simultaneous horizontal displacement to close all the access apertures of said tier without lowering any of the movable frame members thereof.

7. A beehive rack according to claim 6, having two spaced, parallel, back-facing-back frames for supporting said hives in two spaced, upstanding series of tiers, wherein the two frames are interconnected by platform supporting members at a series of levels enabling the brood chambers from the respective tiers of either frame at any given level to be withdrawn on to a platform supported by said supporting members at said level.

8. A beehive rack according to claim 7, wherein the lowered movable frame members are supported by the platform in the second position and serve as guides for withdrawal of the brood chambers.

* * * * *